United States Patent
Cadarette et al.

(10) Patent No.: US 9,910,737 B2
(45) Date of Patent: *Mar. 6, 2018

(54) IMPLEMENTING CHANGE DATA CAPTURE BY INTERPRETING PUBLISHED EVENTS AS A DATABASE RECOVERY LOG

(71) Applicant: International Business Machines Corporation, Armonk, NY (US)

(72) Inventors: Paul M. Cadarette, Hemet, CA (US); James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/730,291

(22) Filed: Jun. 4, 2015

(65) Prior Publication Data

US 2016/0132399 A1    May 12, 2016

Related U.S. Application Data

(63) Continuation of application No. 14/537,927, filed on Nov. 11, 2014.

(51) Int. Cl.
*G06F 17/30* (2006.01)
*G06F 11/14* (2006.01)
(Continued)

(52) U.S. Cl.
CPC ........ *G06F 11/1451* (2013.01); *G06F 3/0482* (2013.01); *G06F 3/04842* (2013.01); *G06F 17/30117* (2013.01); *G06F 17/30368* (2013.01)

(58) Field of Classification Search
CPC ................................................ G06F 17/30368
See application file for complete search history.

(56) References Cited

U.S. PATENT DOCUMENTS 8,589,357 B2   11/2013   Radhakrishnan et al.
8,818,944 B2    8/2014   Chaliparambil et al.
(Continued)

OTHER PUBLICATIONS

IBM, "System and Method for Event analytics centered database recovery", ip.com, An IP.com Prior Art Database Technical Disclosure, Original Publication Date: Aug. 12, 2009. IP.com No. IPCOM000186163. 6 pages.
(Continued)

*Primary Examiner* — Kris Mackes
(74) *Attorney, Agent, or Firm* — Michael O'Keefe

(57) ABSTRACT

A method for implementing a change capture system using an event publishing system as a database recovery log is provided. The method may include determining a set of data based on a description of events for which change capture is possible. The method may also include selecting at least one item of data from within the determined set of data, wherein the at least one item of data requires change capture to be performed. Additionally, the method may include identifying at least one published event, wherein the at least one published event is produced by the event publishing system. The method may include instructing the event publishing system to deliver the at least one identified published event to the change capture system. Furthermore, the method may include receiving the at least one identified published event. The method may also include processing the at least one published event.

5 Claims, 4 Drawing Sheets

(51) Int. Cl.
   *G06F 3/0482*        (2013.01)
   *G06F 3/0484*        (2013.01)

(56) References Cited

U.S. PATENT DOCUMENTS

| | | | |
|---|---|---|---|
| 9,305,272 B2 * | 4/2016 | Abrams | G06Q 10/06 |
| 9,659,042 B2 | 5/2017 | Puri et al. | |
| 2004/0006506 A1 * | 1/2004 | Hoang | G06Q 10/10 |
| | | | 705/14.65 |
| 2010/0161574 A1 * | 6/2010 | Davidson | G06F 17/30572 |
| | | | 707/705 |

OTHER PUBLICATIONS

Lane et al., "Oracle Database: Data Warehousing Guide", 10g Release 2 (10.2), Dec. 2005. Copyright © 2001, 2005, Oracle. 620 pages.

Cadarette et al., "Implementing Change Data Capture by Interpreting Published Events as a Database Recovery Log," U.S. Appl. No. 14/537,927, filed Nov. 11, 2014.

List of IBM Patents or Patent Applications Treated as Related, Nov. 11, 2014.

* cited by examiner

IMPLEMENTING CHANGE DATA CAPTURE BY INTERPRETING PUBLISHED EVENTS AS A DATABASE RECOVERY LOG

BACKGROUND

The present invention generally relates to the field of computing, and more particularly to the capturing of data changes.

Change capture (e.g. change data capture) technology utilizes the database recovery log from the source database to determine the changes that occur in the database. This has impact, both in resources and in administration, for the source database and the system on which it resides. Change capture solutions may encompass a variety of use cases that may include homogeneous replication, heterogeneous replication, and event publishing.

SUMMARY

A method for implementing a change capture system using an event publishing system as a database recovery log is provided. The method may include determining a set of data based on a description of events, wherein the set of data comprises a plurality of data for which change capture is possible. The method may also include selecting at least one item of data from within the determined set of data, wherein the at least one item of data requires change capture to be performed. Additionally, the method may include identifying at least one published event based on the at least one selected item of data, wherein the at least one published event is produced by the event publishing system. The method may include instructing the event publishing system to deliver the at least one identified published event to the change capture system. Furthermore, the method may include receiving, by the change capture system, the at least one identified published event. The method may also include processing the at least one published event received by the change capture system.

According to another embodiment, a computer system for implementing a change capture system using an event publishing system as a database recovery log is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The computer system may include determining a set of data based on a description of events, wherein the set of data comprises a plurality of data for which change capture is possible. The computer system may also include selecting at least one item of data from within the determined set of data, wherein the at least one item of data requires change capture to be performed. Additionally, the computer system may include identifying at least one published event based on the at least one selected item of data, wherein the at least one published event is produced by the event publishing system. The computer system may include instructing the event publishing system to deliver the at least one identified published event to the change capture system. Furthermore, the computer system may include receiving, by the change capture system, the at least one identified published event. The computer system may also include processing the at least one published event received by the change capture system.

According to yet another embodiment, a computer program product for implementing a change capture system using an event publishing system as a database recovery log is provided. The computer program product may include one or more computer-readable tangible storage medium and program instructions stored on at least one of the one or more tangible storage medium, the program instructions executable by a processor. The computer program product may include program instructions to determine a set of data based on a description of events, wherein the set of data comprises a plurality of data for which change capture is possible. The computer program product may also include program instructions to select at least one item of data from within the determined set of data, wherein the at least one item of data requires change capture to be performed. Additionally, the computer program product may include program instructions to identify at least one published event based on the at least one selected item of data, wherein the at least one published event is produced by the event publishing system. The computer program product may include program instructions to instruct the event publishing system to deliver the at least one identified published event to the change capture system. Furthermore, the computer program product may include program instructions to receive, by the change capture system, the at least one identified published event. The computer program product may include program instructions to process the at least one published event received by the change capture system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
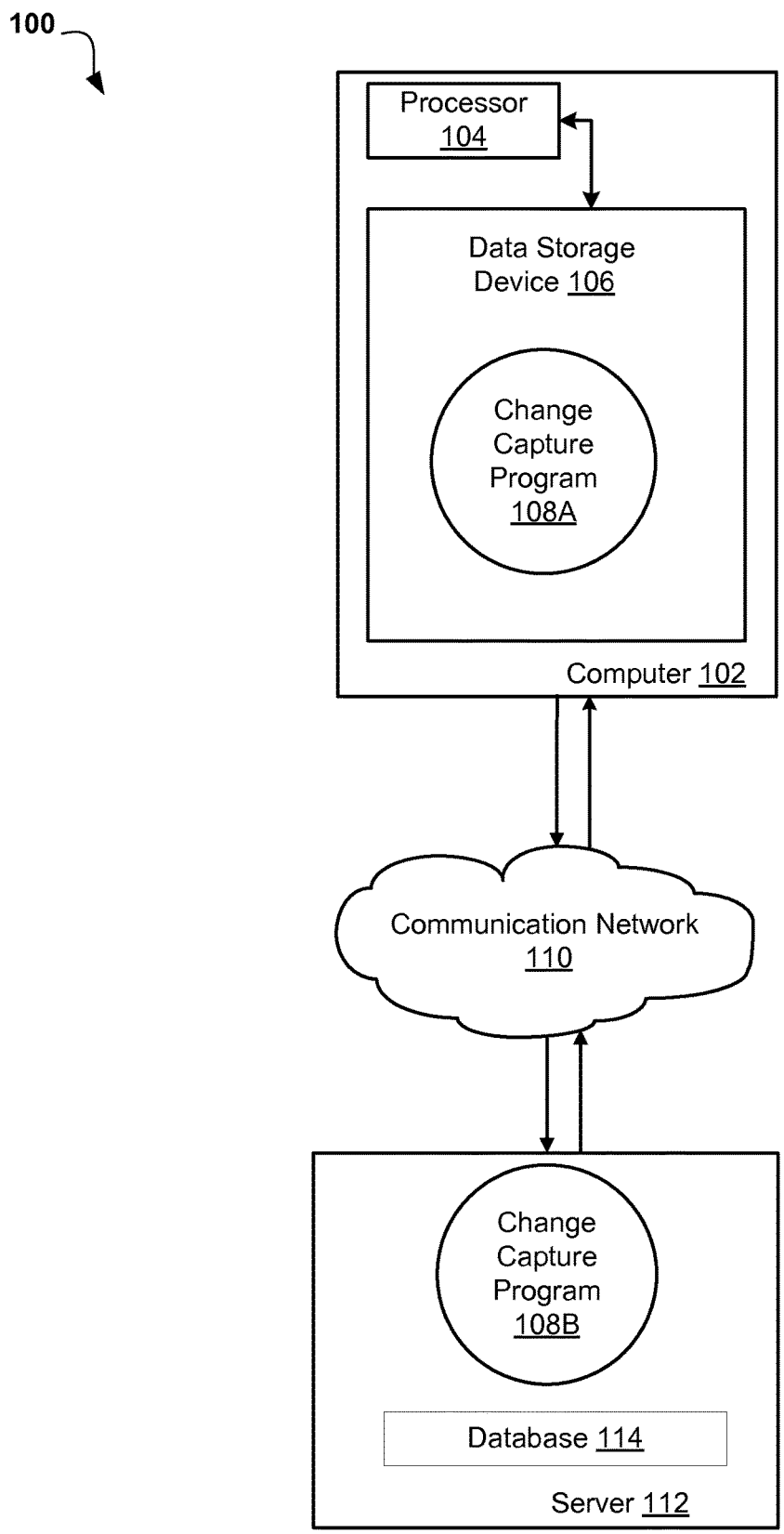
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to change data capture. The following described exemplary embodiments provide a system, method, and program product to, among other things, implement a change data capture system using an events publishing system as a database recovery log.

As previously described, change capture technology utilizes the database recovery log from the source database to determine the changes that occur in the database. Additionally, the database recovery log may be used to analyze the changes made to the database. However, such use of the recovery log may have impact on both the resources and the administration associated with the source database and the system on which the database resides. Change capture solutions may encompass a variety of use cases that may include homogeneous replication, heterogeneous replication, and event publishing. Many consumers of large change capture systems may require support for more than one use case with the same source data objects. However, such a multi-use model may increase overhead on the source system as multiple cursor positions in the database recovery log need to be maintained. Furthermore, a multi-use model may result in multiple physical log readers. A log reader is a program that monitors the database for transactional changes. Upon detecting a database change, the log reader sends the change information to a distribution database. Even in a situation where the same source capture system is implemented for all use cases, the system may require multiple log readers since there may still be excessive overhead as log positioning can differ by use case.

Currently, systems, such as a log shipping system, may be used to reduce the number of physical log readers. A log shipping system sends transactional logs from one database to another on a constant basis may be. However, such a technique may not be available for all database technologies and may incur additional overhead of their own. Therefore, it may be advantageous, among other things, to implement a change capture system that utilizes the information produced by the events publishing system rather than the database recovery log in order to reduce the impact on and lessen overhead of the source database and the system on which the database resides.

According to at least one implementation of the present embodiment, a single physical log reader may be used that emits all changes to a published business events log (e.g. a replication log). Such a use case, referred to as an event publishing system, may act as a filtered log extender, which may isolate the selected subset of data change events into a second replication log stream. Once established, homogeneous and heterogeneous capture engines may capture information from a database with less combined overhead. Therefore, multiple cursor positions may be maintained in an optimized, filtered replication log stream more efficiently than may be done in the original database recovery log, which may not have been designed for such real-time multi-user access. As such, the selected subset of data changes may be the aggregation of all data requirements for the downstream use-cases. Pruning of the replication log may occur as the respective use-cases offload and persist those transactions in target database management.

Additionally, the change data capture system may enhance log reader functionality by using a log stream of published business events as an alternate log source rather than using the database recovery log. The present embodiment may subscribe to events being directly published by a source system. Utilizing the context available for that publication, the change data capture system may determine the type of source database changes that may be inferred from the stream of published events. As such, according to at least one implementation, a user may select which changes may be logged. Therefore, the change data capture system may operate by recording the user selected changes as if the change capture system were capturing those changes directly from the database recovery log.

In some cases, the published business events in the stream may correspond to the individual changes in the source database, such as inserting, updating, or deleting a row of data. In other instances, the events may correspond to business events involving a set of changes to the individual rows potentially across multiple tables. When the events correspond to business events, business-specific logic may be required to determine the corresponding individual changes. Often, change capture may acquire other information about the context of the data change. For example, a timestamp indicating when the change occurred and information about the business user who made the change may be captured by the system.

The present embodiment may minimize the impact on the source system as well as deliver events to an additional subscriber for very little, if any, additional cost for the source system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to implement a change data capture system using an events publishing system as a database recovery log.

According to one implementation, using the database description of events, the change capture system may determine the set of tables from which change data may be provided. Among this set of tables, a user may be able to select which tables the change data capture system may subscribe. Then, for each selected table, the change data capture system may subscribe to the relevant set of events. Capturing changes for a given table may involve subscribing to more than one set of events. Similarly, a single set of events may provide change capture for more than one source table. Once the change capture system has subscribed to a set of events, the change capture system may receive and persist events published by the events publishing system. A change extractor component may consume these events in the same fashion that may be done for a database recovery log. The change extractor may remove events from the persisted store of events using the same algorithms that may conventionally be used to provide log dependency information to the source database.

Referring now to FIG. 1, an exemplary networked computer environment 100 in accordance with one embodiment is depicted. The networked computer environment 100 may include a computer 102 with a processor 104 and a data storage device 106 that is enabled to run a Change Capture Program 108A. The networked computer environment 100 may also include a server 112 that is enabled to run a Change Capture Program 108B and a communication network 110. The networked computer environment 100 may include a plurality of computers 102 and servers 112, only one of which is shown for illustrative brevity. According at least one implementation, the present embodiment may also include a database 114, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

According to the present embodiment, a program, such as a Change Capture Program 108A and 108B may run on the client computer 102 or on the server computer 112. The Change Capture Program 108A, 108B may implement change data capture by using an events publishing system as a database recovery log. The Change Capture method is explained in further detail below with respect to FIG. 2.

Figure 2:
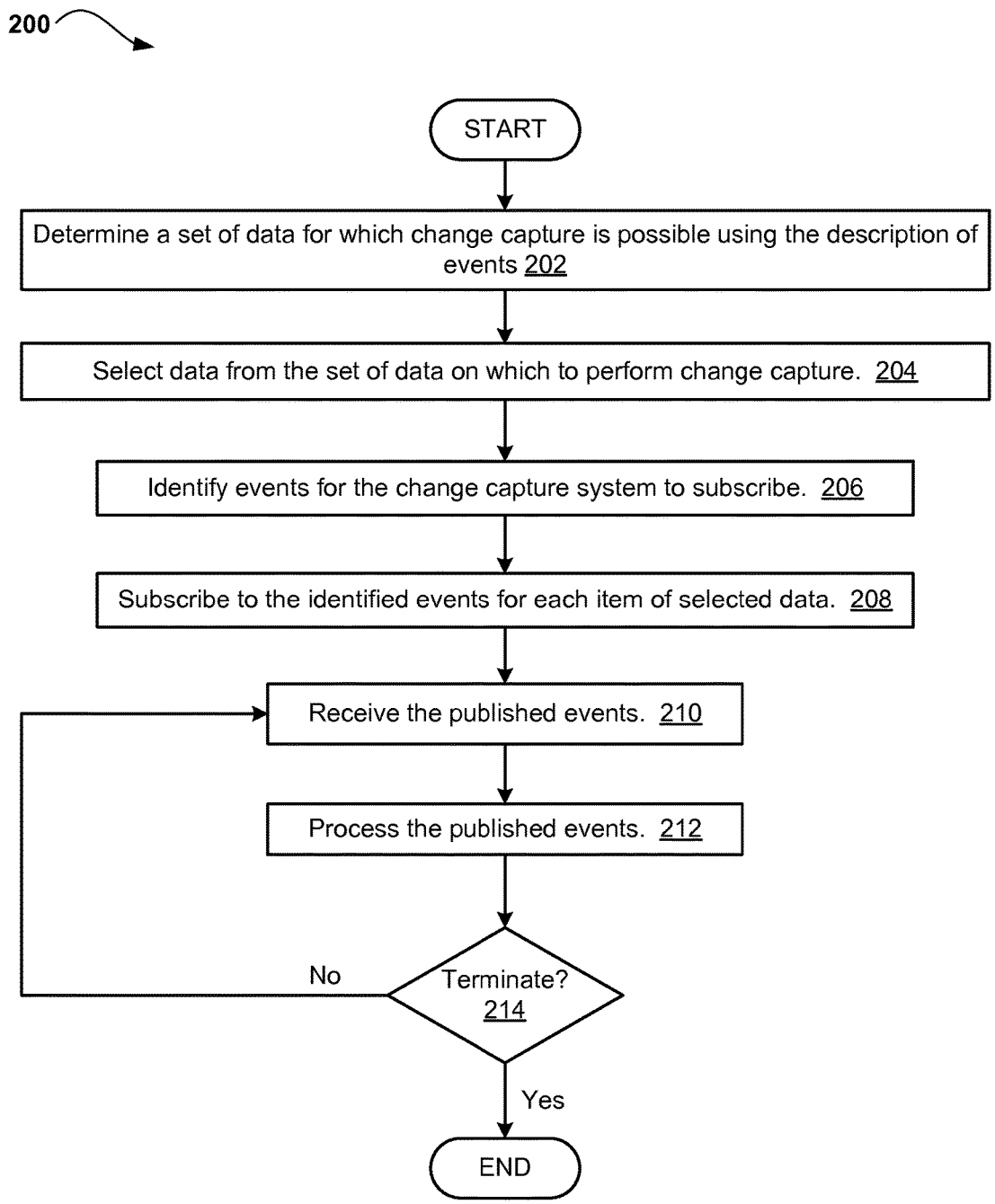
FIG. 2 is an operational flow chart illustrating the steps carried out by a program to use published events to perform change capture.

FIG. 2, an operational flowchart 200 illustrating the steps carried out by a program to use an events publishing system as a database recovery log to perform change capture in accordance with one embodiment is depicted. At 202, the Change Capture Program 108A, 108B (FIG. 1) may determine a set of data that change capture may be possible for based on the information retained within the events publishing system. An event publishing system may include a description of events, which consists of metadata that provides information regarding the event publishing system and events published by the event publishing system. Without the information contained in the description of events, an item produced by the event publishing system may not be consumed since there is no indication of what that published event represents. Therefore, based on the description of events, the present embodiment may determine a set of data, which may include the tables and columns within the tables, from which changes may be extracted. For example, an events publishing system may publish events from a source database that retains customer records, such as customer name, customer address, products owned by the customer, and customer email. The information contained within the published event may originate from several different tables. By analyzing the description of events within the event publishing system, the Change Capture Program 108A, 108B (FIG. 1) may be able to determine the tables and columns within tables from which the information in the published event originated.

Next at 204, a user may be prompted by the Change Capture Program 108A, 108B (FIG. 1) to select a subset of data (at least one item of data within the previously determined set of data) on which to perform change capture. Once the Change Capture Program 108A, 108B (FIG. 1) determines a set of data from which change capture is possible (as previously described in step 202), the user may select from the set of data which data the user would like change capture performed. For example, the Change Capture Program 108A, 108B (FIG. 1) may determine in step 202 that change capture is possible for customer names, customer addresses, products owned by the customers, and customer emails based on the set of data. However, the user may only be interested in the tables containing information relating to customer addresses and customer emails. Therefore, the user may select customer addresses and customer emails as the data on which the Change Capture Program 108A, 108B (FIG. 1) may perform change capture. Selection of the data from the set of data may be achieved through a graphical user interface (GUI), such as a pull-down menu within a user interface of the Change Capture Program 108A, 108B (FIG. 1).

Then at 206, the Change Capture Program 108A, 108B (FIG. 1) may identify which events to subscribe to based on the user selected data. For each item of data that the user selects (previously in step 204), the present embodiment may be able to identify which events published by the event publishing system should be subscribed to in order to capture the data the user desires. An event publishing system may produce a number of events that may be separated into different categories, such as person events or product events. A person event may be an event that is generated by the event publishing system when information about the customer was changed in the source database. Similarly, a product event may be an event generated by the event publishing system when information about a product was changed or a regulatory change was input into the source database. When an event that includes data the user may be interested in is published by the event publishing system, the Change Capture Program 108A, 108B (FIG. 1) may identify that that type of event should be subscribed to so as to capture the data change. For example, the user may have selected customer addresses and customer emails as the data in which the user is interested. Since a change in customer addresses and customer emails may be considered a person event, the Change Capture Program 108A, 108B (FIG. 1) may identify all person events should be subscribed to in order to effectively capture all changes in which the user is interested.

Following next at 208, the Change Capture Program 108A, 108B (FIG. 1) may instruct the event publishing system to deliver (i.e. subscribe) to the identified events based on the user selected data. Once the Change Capture Program 108A, 108B (FIG. 1) identifies which events produced by the event publishing system should be subscribed to in order for the Change Capture Program 108A, 108B (FIG. 1) to capture all of the desired user selected data, the event publishing system may be instructed to deliver (i.e. subscribe) the identified published events to the Change Capture Program 108A, 108B (FIG. 1). Subscribing to an identified event may mean that when an identified event occurs in the source database, the event publishing system may deliver information about the particular event to the Change Capture Program 108A, 108B (FIG. 1). For example, if the present embodiment identifies in step 206 that all person events should be subscribed to, then the present embodiment may subscribe to all person events so that the event publishing system sends information to the present embodiment whenever a change to person data occurs. The information sent by the event publishing system to the Change Capture Program 108A, 108B (FIG. 1) may be in the form of a published event.

Next at 210 within the Change Capture Program 108A, 108B (FIG. 1), all published events that have been subscribed to may be received. Whenever the event publishing system publishes an event of which the Change Capture Program 108A, 108B (FIG. 1) may have previously subscribed, the Change Capture Program 108A, 108B (FIG. 1) may receive the information about that published event. The received events by the Change Capture Program 108A, 108B (FIG. 1) may be placed in a repository, such as the database 114 (FIG. 1). A repository may be a location where published events are persistently stored.

Next at 212, the Change Capture Program 108A, 108B (FIG. 1) may process the published events. Once the Change Capture Program 108A, 108B (FIG. 1) receives a published event and places it in the repository, the published event may be extracted from the repository using a set of algorithms similar to the set of algorithms conventionally used to provide log dependency information to a source database. The Change Capture Program 108A, 108B (FIG. 1) may analyze the extracted information contained in the published event and determine which items of data contained within the published event may be relevant to the user selected data. The Change Capture Program 108A, 108B (FIG. 1) may be able to determine which user selected data may have changed and may record changed user selected data. For example, when the user selected data is customer addresses, the Change Capture Program 108A, 108B (FIG. 1) may record table level data changes for each change in a repository in the user selected data that the Change Capture Program 108A, 108B (FIG. 1) may receive through a published event. However, a published event received by the Change Capture Program 108A, 108B (FIG. 1) may not contain any changed data relevant to the user selected data. For example, the Change Capture Program 108A, 108B (FIG. 1) may receive a person event that contains data relevant to customer phone number and customer email address. Of the information contained within the published event, the user selected data may only be the customer email address. However, the published event only contains changed data for the customer phone number even though the published event also contains unchanged data relating to the customer email address. As such, the Change Capture Program 108A, 108B (FIG. 1) may recognize that the published event does not contain any changed user selected data and may disregard the published event.

Then at 214, it may be determined whether the method may terminate. According to one implementation, the method may terminate based on various circumstances, such as user intervention, the amount of elapsed time, system performance, etc. If it is determined that the method should terminate, then the method may end. However, if at 214, it is determined that the method should not terminate, then the method may continue back to step 210 to receive the published events from the event publishing system.

It may be appreciated that FIG. 2 provides only an illustration of one implementation and does not imply any limitations with regard to how different embodiments may be implemented. Many modifications to the depicted environments may be made based on design and implementation requirements. For example, as previously described, the present embodiment may be implemented in hardware via a graphics display adapter to apply to either a subset or complete screen coverage and may be made software selectable as needed.

Figure 3:
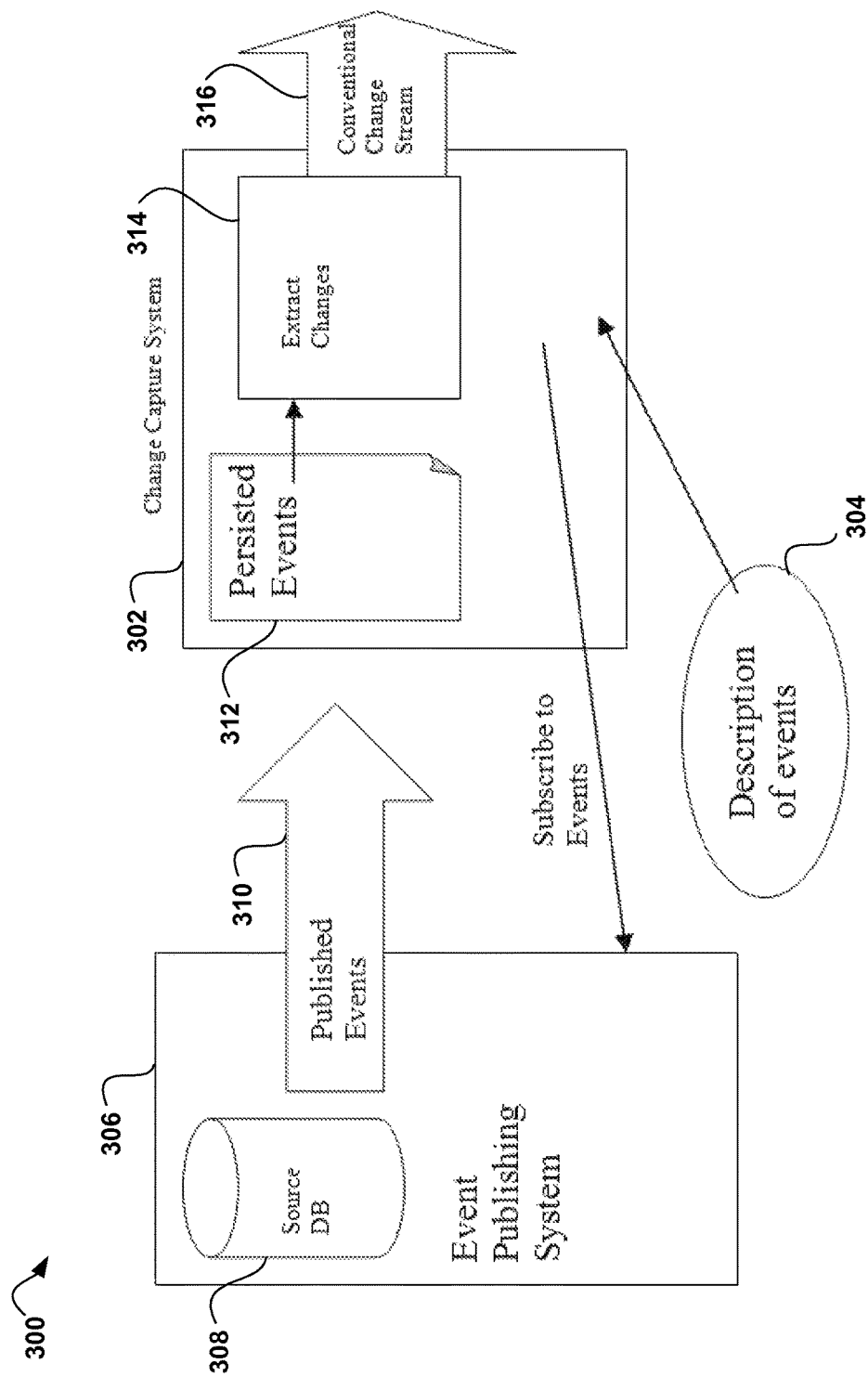
FIG. 3 is an example of a change capture system that implements an event publishing system.

Referring now to FIG. 3, an example 300 of change capture system interpreting published events similar to a database recovery log in accordance with one embodiment is depicted. According to one implementation of the present embodiment, the change capture system 302 may analyze the description of events 304 in order to determine a set of data that change capture may be performed upon. After a user selects data from the set of data on which to perform change capture (step 204 (FIG. 2)) previously described) and the present embodiment identifies events on which to subscribe (step 206 (FIG. 2)) previously described), the present embodiment may subscribe to events published 310 by the event publishing system 306 so whenever a specific change is made in a source database 308 the change capture system may receive a published event 310 that may contain information relating to the user selected data. After subscribing to the identified published events 310, the change capture system 302 may receive the published events 310 and store those published events 310 as persisted events 312 within the change capture system 302. Thereafter, the change capture system 302 may consume the persisted events 312. The consumption of the events within the change capture system 302 starts by extracting the changes 314 from the persisted events 312 stored within the change capture system 302. Then, the change capture system 302 may record the table level changes. However, the change capture system 302 may insert the extracted changes 314 into a conventional change stream 316 to be processed by the client computer 102 (FIG. 1) or client server 112 (FIG. 1).

Figure 4:
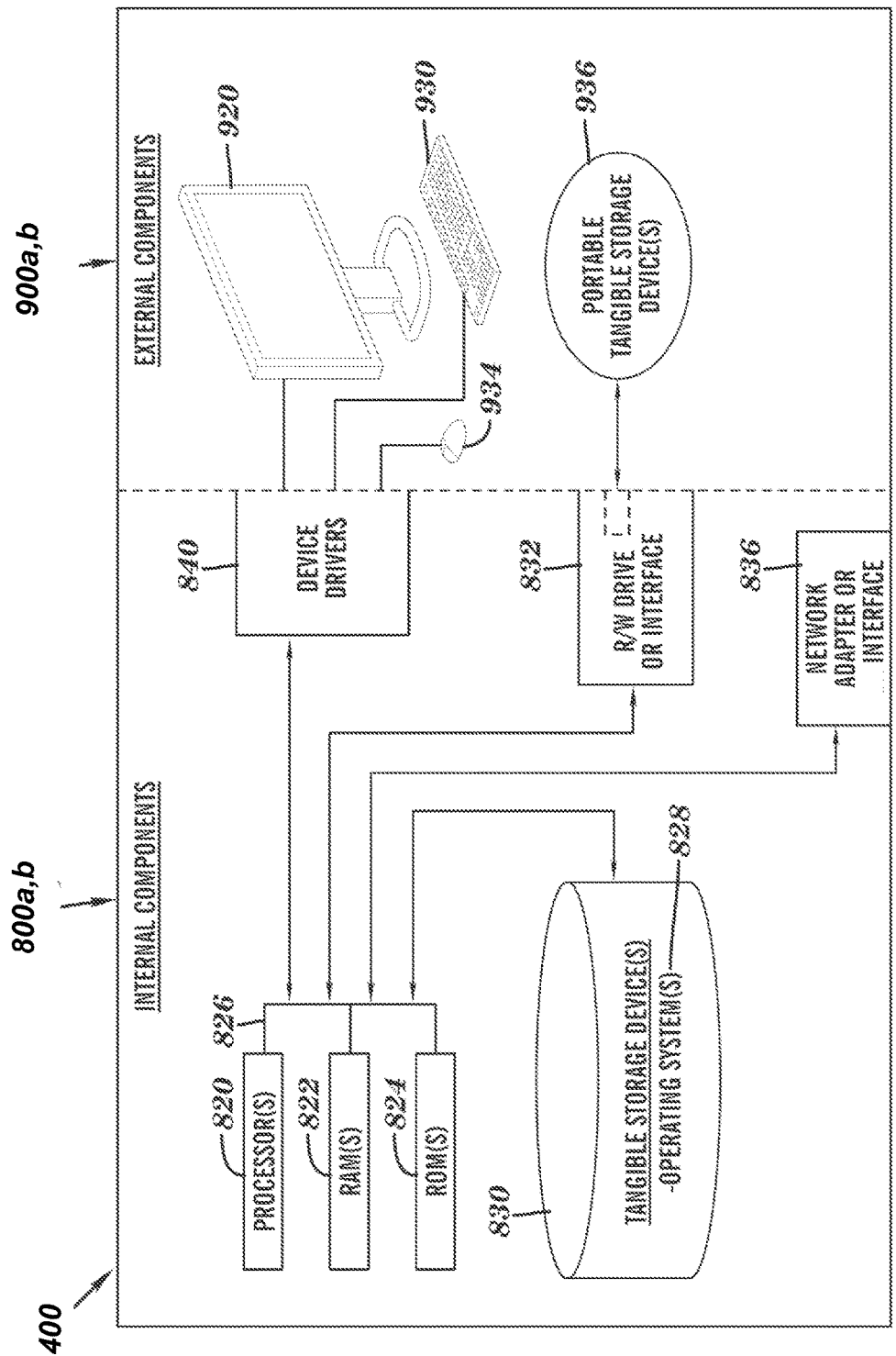
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Change Capture Program 108A (FIG. 1) in client computer 102 (FIG. 1) and Change Capture Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Change Capture Program 108A (FIG. 1), 108B (FIG. 1) and the database 114 (FIG. 1), can be stored on one or more of the respective portable computer-readable tangible storage devices 936, read via the respective R/W drive or interface 832 and loaded into the respective hard drive 830.

Each set of internal components 800*a, b* also includes network adapters or interfaces 836 such as a TCP/IP adapter cards, wireless Wi-Fi interface cards, or 3G or 4G wireless interface cards or other wired or wireless communication links. The Change Capture Program 108A (FIG. 1) in client computer 102 (FIG. 1) and Change Capture Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Change Capture Program 108A (FIG. 1) in client computer 102 (FIG. 1) and the Change Capture Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900*a, b* can include a computer display monitor 920, a keyboard 930, and a computer mouse 934. External components 900*a, b* can also include touch screens, virtual keyboards, touch pads, pointing devices, and other human interface devices. Each of the sets of internal components 800*a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for implementing a change capture system using an event publishing system as a database recovery log, the method comprising:

determining a set of data based on a description of events, wherein the set of data comprises a plurality of data for which change capture is possible;

selecting at least one item of data from within the determined set of data, wherein the at least one item of data requires change capture to be performed;

identifying at least one published event based on the at least one selected item of data, wherein the at least one published event is produced by the event publishing system, and wherein the at least one published event is a person event where a plurality of information related to a customer is changed in a source database;

instructing the event publishing system to deliver the at least one identified published event to the change capture system;

receiving, by the change capture system, the at least one identified published event;

extracting the at least one identified published event from a persisted store, wherein the at least one identified published event is extracted from the persisted store using an algorithm that provides log dependency information for a source database;

analyzing a plurality of information contained within the at least one identified published event;

identifying a change associated with the at least one item of selected data; and recording the identified change to the at least one item of selected data to a repository.

2. The method of claim 1, wherein the recording of the identified change comprises recording a plurality of contextual information regarding the identified change to the at least one item of selected data, wherein the plurality of contextual information comprises a timestamp of the identified change to the at least one item of selected data and a plurality of customer information.

3. The method of claim 1, wherein the selected at least one item of data is selected by a graphical user interface (GUI) comprising a list of a plurality of table data and a plurality of column data.

4. The method of claim 1, wherein the determined set of data comprises a plurality of tables and a plurality of columns within the plurality of tables.

5. The method of claim 1, wherein the identified change to the at least one item of selected data comprises at least one of an insertion of a plurality of information to the source database; an update to a plurality of information in the source database; and a deletion of a plurality of information in the source database.

* * * * *